United States Patent [19]
Czernik et al.

[11] 3,918,165
[45] Nov. 11, 1975

[54] LOCATOR ASSEMBLY FOR MOUNTING MEMBERS FOR ROTARY GAP BRIDGING AND SEALING DEVICES

[75] Inventors: Daniel E. Czernik, Hinsdale; Clarence H. Neff, Skokie, both of Ill.

[73] Assignee: Felt Products Mfg. Co., Skokie, Ill.

[22] Filed: Apr. 25, 1974

[21] Appl. No.: 464,070

Related U.S. Application Data

[62] Division of Ser. No. 287,595, Sept. 11, 1972, Pat. No. 3,843,273.

[52] U.S. Cl.............. 33/174 G; 33/185 R; 408/115
[51] Int. Cl.² .................. E01C 23/00; E01D 19/06; B23B 47/28
[58] Field of Search....... 33/174 G, 185 R; 408/115; 249/9

[56] References Cited
UNITED STATES PATENTS

| | | | |
|---|---|---|---|
| 1,583,946 | 5/1926 | Walters | 408/115 |
| 2,560,382 | 7/1951 | Barr | 33/185 R |
| 2,651,951 | 9/1953 | Altenburger | 408/115 |
| 2,949,798 | 8/1960 | Berta | 33/174 G |
| 3,775,857 | 12/1973 | Handy | 33/185 R |
| 3,843,273 | 10/1974 | Czernik et al. | 408/115 |

FOREIGN PATENTS OR APPLICATIONS 846,886   8/1960   United Kingdom................ 408/115

Primary Examiner—Richard E. Aegerter
Assistant Examiner—Richard R. Stearns
Attorney, Agent, or Firm—Dressler, Goldsmith, Clement & Gordon, Ltd.

[57] ABSTRACT

A locator assembly for locating the longitudinal and transverse spaced positions for anchoring studs for roadway gap bridging and sealing devices in accordance with the temperature on the day of installation of the bridging and sealing devices. Where the slabs adjacent the gap are imperfect and will not support a locator assembly, outriggers are provided for suspending the locator assembly from remote sound portions of the slabs. By properly locating the anchoring studs, the gap bridging and sealing devices are protected, their operating characteristics are preserved, and the slabs adjacent the gap are not damaged due to improper installation of the bridging and sealing devices.

11 Claims, 11 Drawing Figures

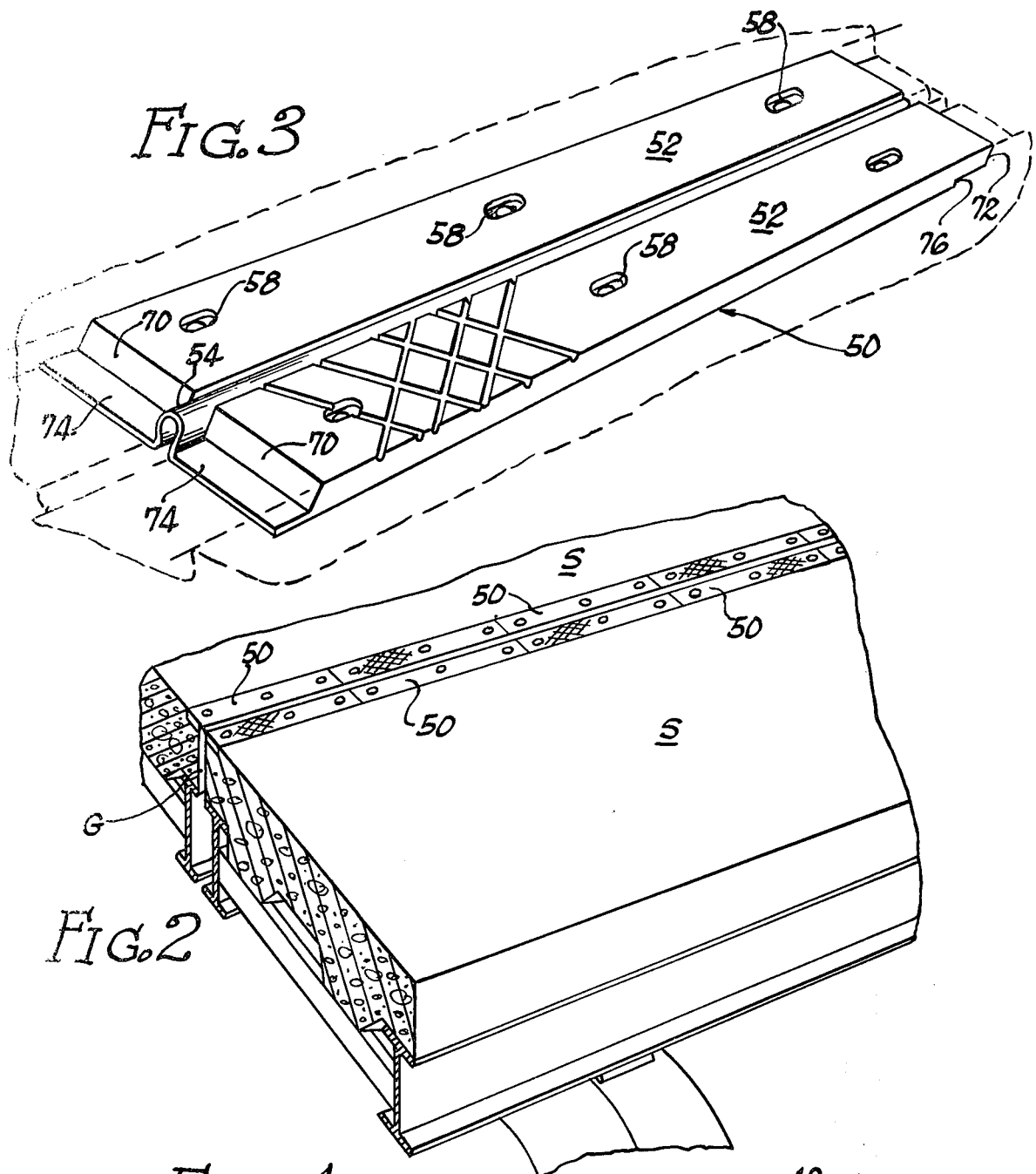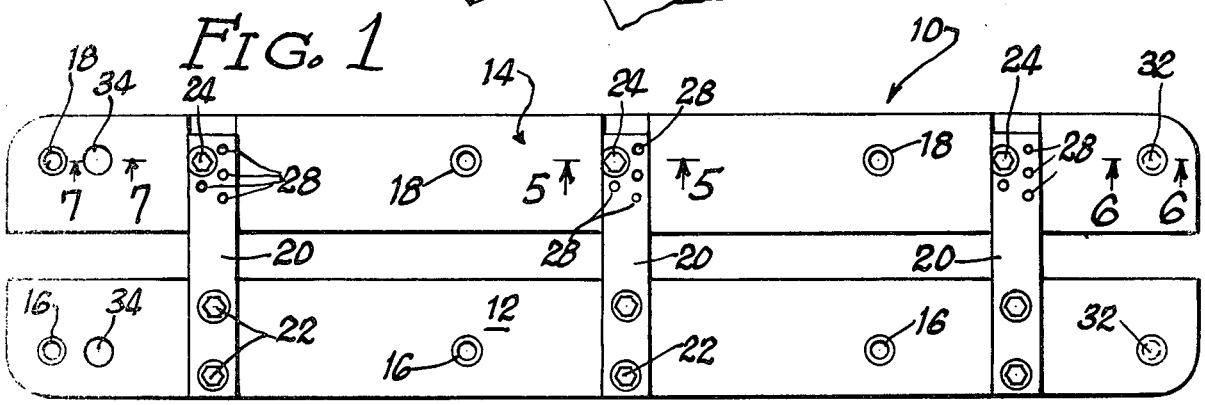

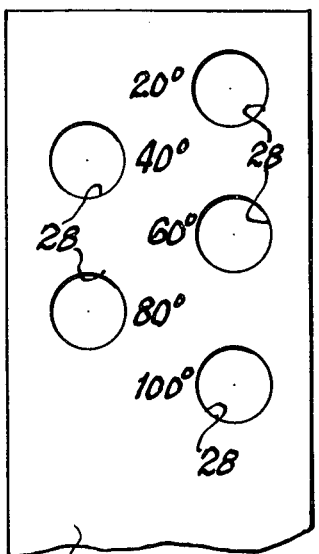
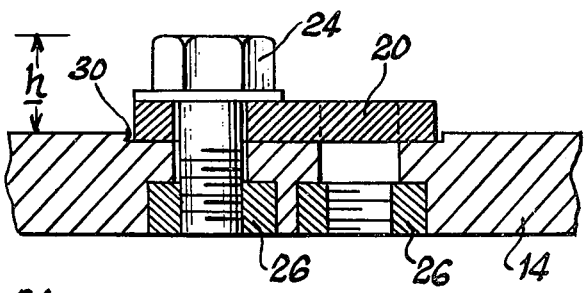
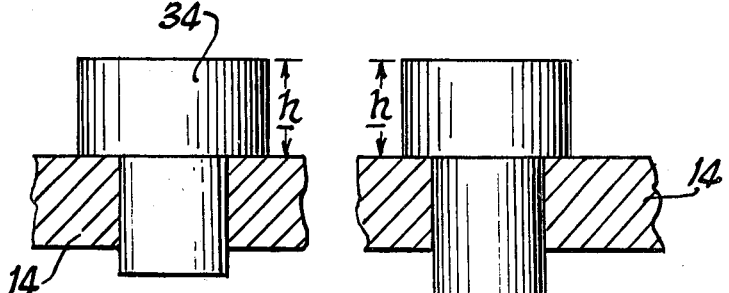
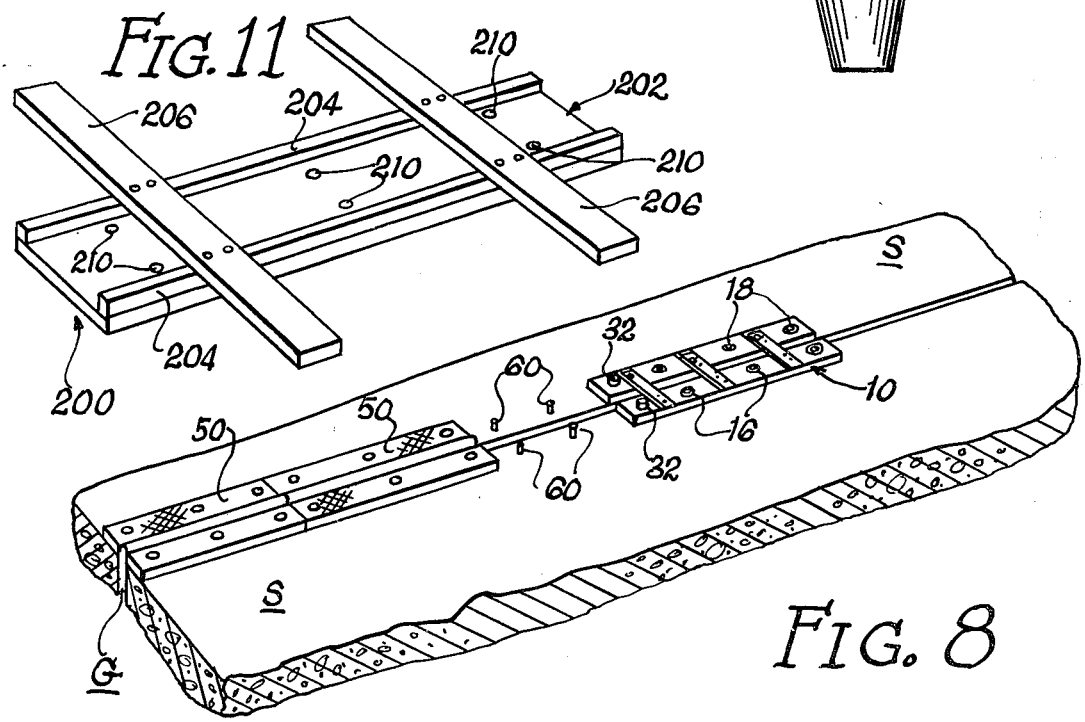

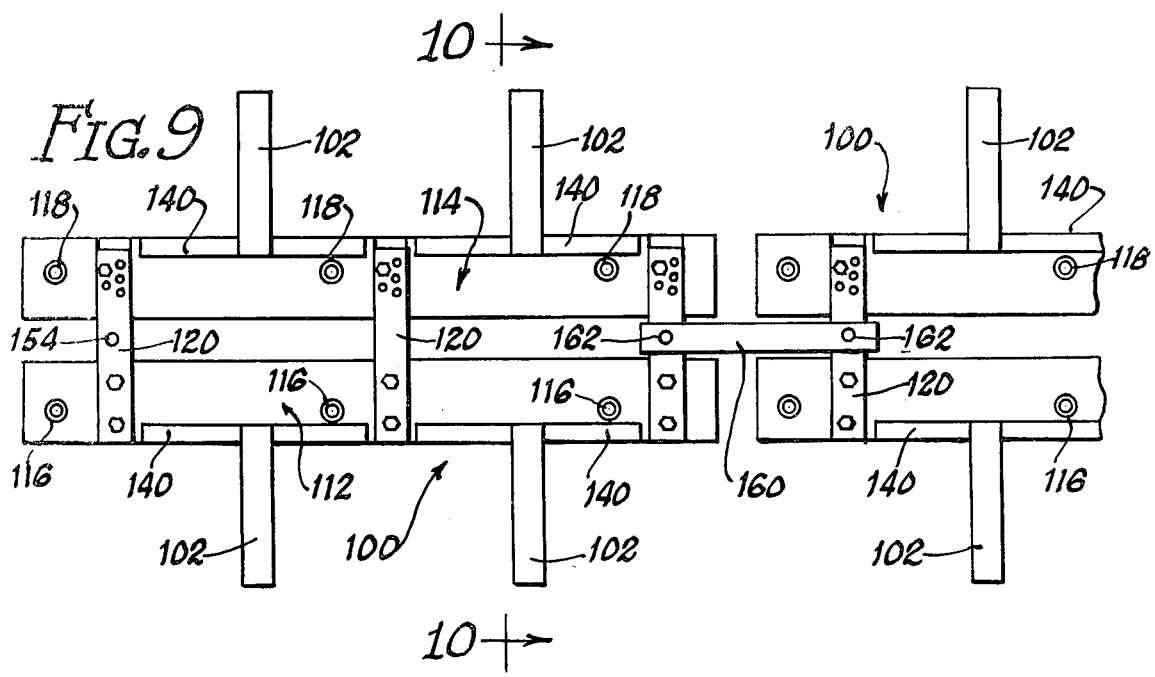
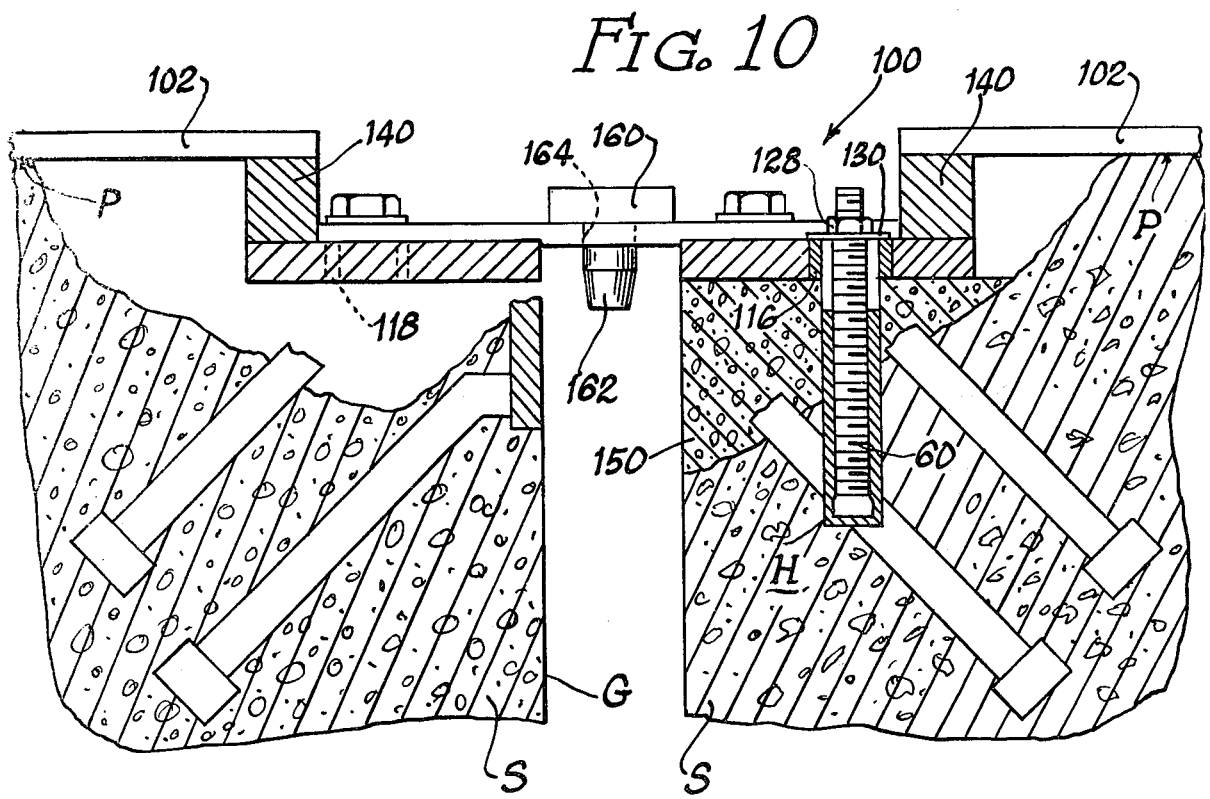

LOCATOR ASSEMBLY FOR MOUNTING MEMBERS FOR ROTARY GAP BRIDGING AND SEALING DEVICES

This is a division of application Ser. No. 287,595, filed Sept. 11, 1972, now U.S. Pat. No. 3,843,273.

This invention relates to a locator assembly for locating the longitudinal and transverse spaced positions for anchoring members which are used to secure roadway gap sealing and bridging devices, such as end dam assemblies, to roadway slabs adjacent a roadway gap.

Gaps between adjacent roadway slabs are commonly bridged for the passage of traffic thereacross. They are also preferably sealed against the passage of water and debris from the surface of the slabs downwardly into the gap. One of the types of bridging and sealing devices which is currently used is an end dam section which is anchored to horizontal slabs surfaces adjacent the gap. When the section is secured to the slabs, it must be located to take into consideration the effects of temperature changes upon the roadway slabs and their responsive movements at the gap.

Because roadway slabs expand and contract with increases and decreases in the ambient temperature, the gap between adjacent roadway slabs is designed to take into consideration the temperature changes to be encountered during the year, and therefore gaps of 2, 3, 4 or more inches are provided. For example, in areas such as the midwestern part of the United States, roadways may be designed to accommodate temperature extremes of perhaps −30°F and 130°F and movements, at the gap, of the slabs of several inches.

If the anticipated temperature extremes and the temperature on any given day of installation of a sealing device are not taken into consideration, then the sealing device may be stretched so far on cold days that it may pull its anchors from the concrete or may so compress on hot days that it buckles and tends to push out the anchors, in each case tending to tear up the adjacent slab portions.

In accordance with this invention, an anchor locator assembly is calibrated for the lateral adjustment of anchor locators for an ambient temperature range for a particular gap bridging assembly so that the anchors for securing the gap bridging sealing device may be properly located with respect to the slabs adjacent the gap. The locator assembly takes into consideration the design characteristics of the particular gap sealing device and the temperature on the day of installation. The locator assembly will be calibrated to identify the positions for anchors so that when secured, the gap bridging sealing device may compress and expand within an anticipated temperature range without tending to destroy the integrity of the slabs.

To that end, a preferred locator assembly includes an elongate rail assembly provided with at least two longitudinally spaced first anchor locators and a laterally adjustable assembly. The adjustable assembly also provides at least two longitudinally spaced second anchor locators. Temperature gauging means for identifying a plurality of different ambient temperature conditions are provided to identify a plurality of different positions of lateral adjustment of the laterally adjustable assembly relative to the elongate rail assembly. The laterally adjustable assembly and the elongate rail assembly are securable against lateral movement in each of the identifiable positions of lateral adjustment, thereby to position pairs of first and second anchor locators in predetermined laterally spaced positions according to the ambient temperature on the day of installation. The lateral spacing of the pairs of anchor locators corresponds to the positions in which anchoring members such as anchoring studs are to be secured to the slabs adjacent the gap and also to the positions in which corresponding, laterally spaced pairs of mounting holes of a gap bridging device should be positioned at the temperature on the date of installation to secure the gap bridging device to the roadway to obtain the designed range of movement from the gap bridging device. The locator assembly also properly locates the positions for the anchoring members longitudinally of the gap.

In another of its aspects, this invention provides an assembly for locating the longitudinal and transverse spaced positions for anchoring members, such as anchoring studs, for roadway gap sealing and bridging devices where broken edges of the slabs adjacent the gap will not themselves suitably support an anchor locator assembly. In that case a locator assembly of this invention contemplates the provision of outriggers. The outwardly extending outriggers serve to suspend a locator assembly from sound portions of the roadway slabs remote from the edges of the slabs which define the gap and indeed, in some cases, the suspended locator assembly may also serve to suspend anchoring studs at proper locations along the gap and as a form for the concrete used to refill and reshape the broken edges of the slabs.

Further objects, features and advantages of this invention will become apparent from the following description and drawings, of which:

FIG. 1 is a plan view of a locator assembly of this invention;

FIG. 2 illustrates a typical environment in which a roadway gap is sealed by an end dam assembly, the anchoring means for which are adapted to be located by a locator assembly of FIG. 1;

FIG. 3 is an enlarged perspective view of an end dam section of the end dam assembly of FIG. 2;

FIG. 4 is an enlarged fragmentary view of a portion of FIG. 1;

FIG. 5 is an enlarged fragmentary cross-sectional view taken substantially along the line 5—5 of FIG. 1;

FIG. 6 is an enlarged fragmentary cross-sectional view taken substantially along the line 6—6 of FIG. 1;

FIG. 7 is an enlarged fragmentary cross-sectional view taken substantially along the line 7—7 of FIG. 1;

FIG. 8 is a fragmentary view similar to FIG. 2 showing several end dam sections installed and showing the locator assembly of FIG. 1 positioned to locate anchoring means;

FIG. 9 illustrates a further embodiment of a locator assembly of this invention;

FIG. 10 is a cross-sectional view taken substantially along the line 10—10 of FIG. 9 illustrating the locator assembly of FIG. 9 suspended across a roadway gap; and FIG. 11 is a perspective view of yet another locator assembly of this invention.

Referring first to FIGS. 1 and 4–7, a locator assembly 10 of this invention comprises an elongate fixed rail member 12 and a second adjustable rail member 14. Rail members 12 and 14 may each be formed of plywood, such as five-eighths inch hard maple plywood, suitably sealed and painted to resist delamination and wear. Fixed rail 12 provides at least two longitudinally spaced first anchor locators, which in the embodiment of FIG. 1 comprises three spaced anchor or hole locators or drill bushings 16. Drill bushings 16 are made of a hard tool steel which resist wear when holes are drilled in underlying slabs. Drill bushings 16 are press fit in suitable bores in the rail 12.

Laterally adjustable rail 14 similarly mounts anchor locators, such as drill bushings 18. Like drill bushings 16, drill bushings 18 are longitudinally spaced from each other to coincide with the spacing of anchoring studs to be in the slabs for a gap bridging and sealing device, such as an end dam section 50. Each pair of drill bushings 16, 18 is laterally spaced along a line generally normal to the longitudinal lines along which the several bushings 16 and 18 lie. It is the lateral spacing of the pairs of locator bushings 16, 18 which the laterally adjustable rail assembly is intended to vary in accordance with ambient temperature conditions on the day of installation.

Adjustable rail member 14 is releasably secured to the fixed rail member 12 in selected positions of lateral adjustment, as by spacer means or bars 20 and suitable securing means. Spacer bars 20 are fixedly secured as by bolts 22 and suitable nuts (not shown) to fixed rail member 12. Bolts 24 and complementary opening defining means, such as jam nuts 26, secure bars 20 to adjustable rail member 14. Each spacer bar 20 provides temperature gauging means to identify a plurality of different ambient temperature conditions, thereby to identify a plurality of different positions of lateral adjustment for rail member 14 relative to rail member 12, and thereby to provide for selective spacing between the anchor locators 16 and 18 to correspond to different ambient temperature conditions.

As seen in FIG. 4, in the embodiment illustrated, there are five identifiable temperature conditions represented by apertures 28 provided in each spacer bar 20. The temperatures which may be selected range in 20° increments from 20°F to 100°F. For convenience, the temperature gauging apertures 28 are located in two longitudinally spaced rows, the apertures of each row being alignable, respectively, with one of the two jam nuts 26.

When an ambient temperature corresponding to one of those provided by apertures 28 is to be selected, bolts 24 are removed and are then inserted through the appropriate temperature apertures in each spacer bar, such as the forty degree apertures illustrated in FIG. 4, and are then threaded into the underlying jam nuts 26 releasably to secure the laterally adjustable rail 14 and the fixed rail 12 against relative lateral movement. In that position, the drill bushings 16, 18 are located at a predetermined spacing from each other both longitudinally and laterally of the locator assembly 10, and are ready for the drilling of holes for the anchoring studs in the concrete adjacent a gap G in positions coinciding with the design location of the anchor stud holes in the end dam sections to be used at the gap.

As seen in FIG. 5, rails 12 and 14 are slightly undercut at 30 at the spacer bars 20 to resist relative movement of the rails longitudinally of each other.

A typical end dam assembly for which the locator assembly of this invention is intended properly to locate the relative positions for anchoring studs or the like comprises a plurality of longitudinally disposed, elongate end dam sections 50. Each section 50 comprises a pair of spaced, longitudinally extending parallel side pads 52 joined centrally by a gap bridging, longitudinally extending joint membrane 54 which may be fabric reinforced. Membrane 54 is substantially thinner than side pads 52 and is secured to the side pads adjacent the lower edges of the side pads. Side pads 52 not only secure the sections 50 to slabs S, but also act as an armor for the road surface edges, preventing crumbling, spalling, and the like. Each end dam section 50 is preferably integrally formed, as by being extruded or molded of a suitable elastomeric material, such as rubber or a polychloroprene or neoprene rubber.

Each side pad 52 is generally rectangular in transverse cross section and may embed a longitudinally extending reinforcing plate (not shown). The reinforcing plates extend substantially the entire length of side pads 52, are parallel to the upper surfaces of the slabs and serve to distribute the anchoring stud load between anchoring studs. Each side pad defines a plurality of properly located bolt holes 58, such as three, which are proportioned to accommodate and receive a threaded anchoring stud 60. Washers and suitable nut means secured to the studs 60 serve to secure the side pads 52 to the edges of the deck slabs S adjacent gap G. The studs 60 are suitably secured in deck slab S, as by an epoxy-cement grout in a known manner after holes for them have been bored, following locating of their proper positions by a locator assembly of this invention.

The upper surfaces of the side pads 52 actually serve as roadway or deck surfaces and as such they are ultimately level with the upper surface of slabs S. Because the upper surfaces form part of the roadway surface, to provide for maximum traction, the upper surfaces may be suitably patterned or grooved.

Desirably the end dam sections 50 are adhered to the slabs S by a suitable adhesive which is applied intermediate the lower surfaces of the pads 52 and the confronting slab surfaces. When so secured and positioned, side pads 52 not only seal against the passage of water under the pads and downwardly through the gap G, but also protect the edges of the slabs adjacent gap G from breakage and crumbling.

Because gaps to be sealed are frequently one hundred or more feet in length, it is neither feasible nor desirable to provide end dam sections 50 which are commensurate in length with such slabs. Accordingly, a gap G may be bridged and sealed by a plurality of end dam sections 10 disposed in an end-to-end array, and each end dam section may be formed to be sealingly secured to the adjacent last preceding one.

To that end, one end of side pad 52 has first tapered end faces 70 and the other end has a second tapered end face 72, the tapers of which are generally complementary. Adjacent the end providing end faces 70, joint membrane 54 projects outwardly and integrally with additional longitudinal seal segments 74. The lower surfaces of side pads 52 at the end providing end faces 72 define notches 76 to receive the seal segments 74. When adjacent section ends are juxtaposed portions of joint membranes 14 of adjoining end dam sections will overlie each other, and seal segments 74 will underlie and fit within notches 76. When a suitable adhesive is interposed between confronting end faces 70 and 72, between overlapping areas of adjacent joint membranes 54, and between seal segments 74 and notches 76, a secure, watertight, and substantially permanent joint will be formed between adjoining end dam sections 50. As such, a suitable number of end dam sections 50 may be joined together to form a sealed, gap bridging longitudinal end dam assembly commensurate in length with any usual length or width of deck slabs.

The side pads 52 and membrane 54 are so configured and arranged that in all positions of movement of the slabs, hence of the membrane, the membrane 54 is untensioned, thereby transmitting substantially no reaction load to the studs or adhesive, and exerting no load on the side pads or on the slabs. That desired end is assured when the anchoring stud holes are laterally located according to the ambient temperature at the time of installation. The proper lateral and longitudinal spacings of the anchoring studs 60 is most effectively obtained by using a locator assembly of this invention.

Not only that, but the proper lateral location of the studs assures the proper functioning of end dam sections incorporating a flexible membrane of the type of membrane 54 which is designed to discharge dirt and debris from the assembly, thereby minimizing possible damage to the end dam assembly and impairment of its sealing function.

A first set of anchoring stud holes for an end dam section may be provided by positioning a properly adjusted locator assembly on slab surfaces adjacent a gap, and thereafter drilling holes in slabs S through bushings 16 and 18 with a suitable drill and drill bit sized to pass through bushings 16, 18. The locator assembly 10 is then removed and the guide pins 32 which are provided at the end of each of the rails 12 and 14 are positioned in the two end anchoring stud holes to locate the next series of holes. Guide pins 32 are press fit into the rails (see FIG. 6) and project below the rails 12 and 14 a distance sufficient to enter laterally spaced, previously drilled end anchor holes, thereby properly to locate the hole locators or drill bushings 16 of locator assembly 10 longitudinally of the roadway gap for the next set of anchor holes to be drilled through bushings 16 and 18.

FIG. 8 illustrates a locator assembly 10 of this invention positioned for the drilling of anchoring stud holes. At the left of FIG. 8, two end dam sections 50 have already been installed. Between the locator assembly 10 and the previously installed end dam sections, two pairs of laterally spaced anchoring studs 60 are shown in position. Two previously drilled anchoring stud holes have received a pair of the guide pins 32 thereby to position the drill bushings 16 and 18 properly for drilling of the next series of anchoring stud holes. When those holes are drilled, the locator assembly will be removed, the remaining two anchoring studs will be secured in the holes in which guide pins 32 were located, and another end dam section will be mounted in secured end-to-end relation to those already installed.

Guide pins 32 may desirably be removable so that one may be removed to allow for slight angling of a locator assembly with respect to a previously located set of anchoring holes. Because the rail members 12 and 14 are fixed against relative lateral and longitudinal movement, one guide pin 32 is sufficient properly to locate the positions for new anchoring holes.

It will also be noted that support members 34 (FIG. 7) are provided. The heads of members 34 extend a distance *h* above the upper surfaces of rails 12 and 14, a distance equal to the vertical extension of guide pins 32 and bolts 22 and 24. The purpose of this is to minimize the breakage of the rails when they are out of use and are resting on their upper surfaces if the ends where the support members 34 are located are stepped on accidentally.

A further embodiment of this invention is illustrated in FIGS. 9 and 10. As is seen in FIG. 10, portions of the slabs adjacent a roadway gap G are broken away. In the case illustrated, a sliding metal plate gap bridging assembly had previously been installed at the gap. It failed, and the sliding plates, together with some of the concrete and portions of the anchors, had been removed. Because of that, the slab surfaces immediately adjacent the gap are not suitable for directly supporting a locator assembly.

In such an environment a further locator assembly 100 of this invention is useful. Locator assembly 100 may be substantially identical to locator assembly 10, except that it is provided with an outrigger assembly comprising a plurality of outrigger members 102 which are sufficiently long to reach to sound portions P (FIG. 10) of the slabs, thereby to suspend the locator assembly 100 over the gap and the immediately adjacent edges of the slabs.

The locator assembly 100 comprises a fixed elongate rail member 112 and an adjustable rail member 114. Rail members 112 and 114 provide drill bushings 116, 118 positioned to coincide with the bolt holes of an end dam section to be secured to the slabs. The adjustable rail member is releasably securable to the fixed rail member by spacer bars 120 which are secured by jam nuts and bolts to the adjustable rail member in the manner described in connection with the embodiment of FIGS. 1–8.

As best seen in FIG. 10, the elevation at which the bases of the rail members 112 and 114 is located is determined by the vertical dimension of the gap bridging means to be used. The desired elevation is adjusted for by shim members 140. Shims 140 are preferably secured to the upper surfaces of rail members 112 and 114 and serve to secure the outriggers 102 at their upper edges. The shims and outriggers may be of wood and may be nailed to each other.

In use, a locator assembly 100 is suspended, for example as illustrated in FIG. 10, and bolt holes H are drilled through the drill bushings 116, 118, downwardly into the sound concrete of the slabs S. Thereafter, anchoring studs 60 are suspended from the drill bushings 116, 118 so that the upper end of each stud is located at the proper elevation with respect to the upper roadway surface of the slabs S, i.e., somewhat below the upper surface so that it will be recessed within an end dam section 50. That elevation is maintained by threading a nut 128 on each anchoring stud 60 and suspending the stud by the nut from a washer 130 positioned over the associated drill bushing. Thereafter, anchoring grout C, such as an epoxy cement, is introduced into the holes H and the studs become securely anchored and fixed in position. Concrete 150 is thereafter provided to finish the slab edges and to ready them with horizontal surfaces to receive the end dam sections. This may be accomplished by positioning a piece of upwardly extending foam or wood forms in the gap to provide lateral support for the body of concrete 150.

Because the slabs with edges such as those illustrated by FIG. 10 are not adapted readily to receive guide pins, such as pins 32, in previously bored holes, it is necessary otherwise to locate the drill bushings 116, 118 of successive locator assemblies 100. To that end, a longitudinal spacer member 160 is provided. Spacer member 160 mounts a pair of depending pins 162 to be received within complementary bores 164 in the two end spacer bars 120. After a first locator assembly 100 has been positioned for use, subsequent locator assemblies 100 may be positioned relative to the first by inserting the pins 162 in bores 164. In this way, the drill bushings of the second and subsequent locator assemblies are properly positioned with respect to those of the first, thereby properly to locate the anchoring holes for a series of end dam sections to be installed at a gap in an end-to-end array.

Although a locator assembly 100 in accordance with FIGS. 9 and 10 is a preferred embodiment for use in environments such as that illustrated by FIG. 10, it is also possible to utilize a further locator assembly 200 for use for repair installations of the character illustrated by FIG. 10. In such cases a locator assembly 200 may comprise a rail assembly 202 which is provided with shims 204 and outriggers 206. Locator assembly 200 may be similarly supported from sound portions P of roadway slabs, as illustrated by FIG. 10. Rail assembly 202 may define appropriate drill bores 210 laterally spaced in accordance with the temperature conditions on the day of installation and longitudinally spaced to coincide with the bolt hole positions for a particular end dam section. Anchoring studs may be supported, as by nuts 128 at bores 210 to be cemented in place, as described in connection with the locator assembly 100.

Where the edges of the slabs have been so far broken down that there is either an insufficient thickness of sound concrete or an inordinately long stud would have to be used, a stud may be secured, as by two nuts 128, one on each side of the rail, to the locator assembly to be held while a suitable grout is positioned around the stud to secure it to the slab. The single rail assembly 202, with the longitudinally continuous shims 204, may also serve as an improved form for shaping and conforming the concrete to be added to finish the edges of the slabs adjacent the gap, thereby to ready them to support a gap bridging end dam assembly. Indeed wooden form members may be nailed to the bottom of rail assembly 202 to fit into the gap and to provide lateral support for the repair cement. Successive assemblies 200 may be longitudinally oriented, as by a spacer bar assembly 160.

Although a particular laterally adjustable locator assembly has been described, others which function similarly but which are differently constructed may be utilized. For example, a fixed rail member may be provided which, in plan view, mounts an overlying second adjustable rail member or rail member segments which are laterally movable on the fixed rail member. Appropriate apertures in the first rail member are provided so that the anchor locators such as drill bushings of the movable rail member or segments will confront the slab edges where the stud holes are to be drilled or from which studs may be suspended.

Further, a plurality of temperature identifying means may be positioned in the adjustable rail (such as by a plurality of jam nuts) and the spacer bars may provide only a single aperture through which a bolt passes into the jam nut selected in accordance with the ambient temperature. Alternatively, clamps for securing the rails together in a great multiplicity of different laterally spaced relationships may be utilized.

These and other modifications within the scope and purview of this invention will become apparent from the preceding description and drawings. Accordingly, we intend the scope of this invention to be limited only in accordance with the claims.

We claim:

1. A locator assembly adapted to be supported at a roadway gap for locating the longitudinal and transverse spaced positions for anchoring members for securing roadway gap sealing and bridging devices to adjacent roadway slabs defining the gap where the width of the gap varies as a function of temperature, said locator assembly comprising an elongate rail providing at least two longitudinally spaced first anchor locator means, template means providing at least two longitudinally spaced second anchor locator means, said template means being secured to said elongate rail by means for laterally adjusting the distance between each of the laterally spaced pairs of first and second anchor locator means, temperature gauging means for identifying a plurality of different ambient temperature conditions thereby to identify a plurality of different positions of lateral adjustment, means for releasably securing said template means and said elongate rail against relative lateral movement in each of said identified positions of lateral adjustment, whereby said first and second pairs of anchor locator means are releasably securable in different positions of lateral adjustment in accordance with the ambient temperature, thereby properly positioning said anchor locator means to locate anchor holes to be provided in adjacent roadway slabs, and a guide pin mounted on said locator assembly and positioned to extend downwardly into a previously formed anchor hole to properly position said anchor locator means longitudinally of the roadway gap.

2. A locator assembly in accordance with claim 1 in which said temperature gauging means comprises a plurality of openings defined by one of said lateral adjusting means and said template means, and said securing means comprises an aperture in the other of said lateral adjusting means and said template means and wherein said releasable securing means comprises an elongate member removably positioned in one of said openings and said aperture.

3. A locator assembly in accordance with claim 1 in which said anchor locator means are each an aperture through which a drill bit is adapted to pass.

4. A locator assembly in accordance with claim 3 in which said anchor locator means are drill bushings and there are at least three pairs of laterally spaced first and second drill bushings and in which there are a pair of said guide pins laterally spaced from each other.

5. A locator assembly in accordance with claim 1 in which said template means comprises a second elongate rail laterally movable with respect to said first elongate rail, and said lateral adjusting means comprises at least two longitudinally spaced spacer bars fixedly secured to said first elongate rail and releasably secured to said second elongate rail.

6. A locator assembly in accordance with claim 5 and wherein said temperature gauging means comprises a plurality of laterally spaced apertures defined by each said spacer bar and at least one opening in said second rail positioned to be aligned with each of said laterally spaced apertures, and wherein said securing means further comprises an elongate member to be removably positioned in an aligned opening and aperture.

7. A locator assembly in accordance with claim 1 and outrigger means for suspending said locator assembly from roadway slabs over a roadway gap.

8. A locator assembly adapted to be suspended on a roadway over a roadway gap for locating the longitudinal and transverse spaced positions for anchoring members for securing roadway gap sealing and bridging devices and for suspending the anchoring members while they are secured adjacent the roadway gap, said assembly comprising an elongate gap spanning rail assembly defining first longitudinally spaced anchor locator means and second longitudinally spaced anchor locator means, pairs of said first and second anchor locator means being laterally spaced from each other on a line generally normal to the longitudinal line along which said first locator means lie, and outriggers secured to said rail assembly and extending outwardly of each side of said rail assembly to overlie a roadway adjacent a gap for suspending said locator assembly therefrom and further comprising means for securing a pair of like assemblies to each other in a longitudinally aligned array.

9. An assembly in accordance with claim 8 in which each of said anchor locator means are apertures through which a drill bit is adapted to pass.

10. A locator assembly adapted to be suspended on a roadway over a roadway gap for locating the longitudinal and transverse spaced positions for anchoring members for securing roadway gap sealing and bridging devices and for suspending the anchoring members while they are secured adjacent the roadway gap, said locator assembly comprising an elongate gap spanning rail assembly defining first longitudinally spaced anchor locator means and second longitudinally spaced anchor locator means, pairs of said first and second anchor locator means being laterally spaced from each other on a line generally normal to the longitudinal line along which said first locator means lie, outriggers secured to said rail assembly and extending outwardly of each side of said rail assembly to overlie a roadway adjacent a gap for suspending said locator assembly therefrom, and wherein said rail assembly includes a laterally adjustable template means which mounts said second anchor locator means for adjusting the lateral distance between said pairs of first and second anchor locator means, temperature gauging means for identifying a plurality of different ambient temperature conditions thereby to identify a plurality of different positions of lateral adjustment, and means for securing said template means and said rail assembly against lateral movement in each of said identified positions of lateral adjustment.

11. An assembly in accordance with claim 10 wherein said template means comprises an elongate rail member laterally moveable with respect to said rail assembly, and said securing means comprises at least two spacer bars secured to said elongate rail and releasably secured to said rail assembly.

* * * * *

UNITED STATES PATENT OFFICE
CERTIFICATE OF CORRECTION

PATENT NO. : 3,918,165
DATED : November 11, 1975
INVENTOR(S) : Daniel E. Czernik and Clarence H. Neff It is certified that error appears in the above-identified patent and that said Letters Patent are hereby corrected as shown below:

In the Title, "ROTARY" should read -- ROADWAY --;

Column 10, line 26, (claim 11), -- movable -- is misspelled.

Signed and Sealed this second Day of March 1976

[SEAL]

Attest:

RUTH C. MASON
Attesting Officer

C. MARSHALL DANN
Commissioner of Patents and Trademarks